United States Patent [19]
Allen

[11] 3,960,998
[45] June 1, 1976

[54] METHOD FOR PRODUCING LARGE RIGID FOAM PANELS

[76] Inventor: Samuel B. Allen, B-2 Gypsy Hill Road, Landenberg, Pa. 19350

[22] Filed: Oct. 4, 1971

[21] Appl. No.: 186,190

Related U.S. Application Data
[62] Division of Ser. No. 879,802, Nov. 25, 1969, abandoned.

[52] U.S. Cl. ................ 264/45.1; 52/309; 428/304; 264/32; 264/45.2; 264/46.9; 264/54; 264/250; 264/255; 264/263; 264/314
[51] Int. Cl. .......................... B29D 27/04
[58] Field of Search .............. 264/47, 45, 54, 32, 264/250, 255, 263, 314; 156/187, 195, 78, 79, 191; 52/309

[56] References Cited
UNITED STATES PATENTS

| | | | |
|---|---|---|---|
| 2,377,608 | 6/1945 | Bronson | 156/195 X |
| 2,731,070 | 1/1956 | Meissner | 156/191 X |
| 2,910,730 | 11/1959 | Risch | 264/45 |
| 3,166,454 | 1/1965 | Voelker | 264/45 X |
| 3,181,199 | 5/1965 | Voelker | 264/47 X |
| 3,253,731 | 5/1966 | Fink et al. | 264/45 X |
| 3,399,095 | 8/1968 | Hyland | 264/47 X |
| 3,443,276 | 5/1969 | Smith et al. | 264/47 X |
| 3,537,929 | 11/1970 | Keith et al. | 264/47 X |
| 3,548,453 | 12/1970 | Garis | 264/45 X |
| 3,607,492 | 9/1971 | Keith et al. | 156/187 X |
| 3,695,959 | 10/1972 | Keith et al. | 264/45 X |

FOREIGN PATENTS OR APPLICATIONS
| | | | |
|---|---|---|---|
| 5,702 | 7/1932 | Australia | 156/195 |

*Primary Examiner*—Philip E. Anderson
*Attorney, Agent, or Firm*—Robert T. Dunn

[57] ABSTRACT

A method for making a panel of plastic foam includes first coating a flexible ribbon on one side with foam and immediately thereafter while the foam is soft and flowable, laying the ribbon on a form with the foam coated side against the form. Length after length of the foam coated ribbon is laid on the form side by side in courses sufficiently close in order that the foam coating flow and cohere together on the form and thereafter the foam cures providing a panel of foam having the shape of the form.

2 Claims, 16 Drawing Figures

METHOD FOR PRODUCING LARGE RIGID FOAM PANELS

This is a division of application Ser. No. 879,802, filed Nov. 25, 1969. The invention relates to a method of forming plastic foam and more particularly for making relatively large rigid plastic foam panels.

Heretofore, plastic foam panels or sheets have been made by pouring foam plastic into a mold and allowing the foam to rise and fill out the mold. Two techniques have been employed, called the vertical pour and the horizontal pour methods. In both of these techniques, a mold having at least five sides is filled with foam poured from a nozzle, usually manipulated by a workman. With the vertical pour technique, the panel mold is closed on both the major faces of the panel and the panel is erected vertically. The top end or at least part of the top end of the mold is open. While the mold is in this vertical position, the foam mix is poured into the top end of the mold. The liquid mix immediately falls to the bottom of the mold and commences to foam filling out the mold from the bottom to the top. When the conventional liquid foam mix is poured into a vertical mold, the mix rise is limited to about two feet. If frothing foam is injected into the vertical mold, an eight foot rise can be achieved. The frothing foam injected floats on the rising foam reducing sheer lines in the cured foam. Conventional foam is poured in substantially liquid form and in a matter of minutes foams to as many as thirty times its original volume. Frothing foam is dispensed partially preexpanded and expands only a few times the original volume at injection. It tends to more completely fill out narrow wall molds and cavities than the conventional poured foam mix.

The horizontal pour technique for molding panels or sheets employs a horizontal mold with a major face of the mold open. Usually, a conventional foam mix is poured into the horizontal mold and spreads uniformly to all corners of the mold. Since the conventional mix is substantially liquid when poured, it will flow in the mold as it rises and the flow will insure uniform distribution throughout the mold. However, if frothing foam is used, it must be distributed throughout the horizontal form by moving the dispensing nozzle about the form, because the frothing foam has less tendency to flow. The horizontal pour technique usually results in a panel of more uniform density, whether conventional or frothing foam is used; however, the operation requires more space than the vertical pour technique and since the mold must have one face completely open, that open face cannot be poured against another material to form a laminate therewith. The vertical pour technique results in panels of less uniform density, but better uniformity of dimension and permits pouring to form a sandwich of the foam between layers of other materials. The other materials can form the major faces of the mold. Furthermore, as already mentioned, panels made by the vertical poured technique even with frothing foam are limited in dimension by the eight foot rise limitation.

It is one object of the present invention to provide method for making plastic foam panels which avoids some of the above mentioned limitations of prior methods and apparatus.

It is another object of the present invention to provide method for making relatively large rigid foam panels in which the foam may be laminated between layers of other materials and the length and width of the panel is not limited by the rise distance of the foam.

It is another object to provide method for making relatively large plastic foam panels of predetermined dimensions and shape.

It is another object to provide method for making relatively large panels of rigid plastic foam of predetermined dimensions and shape with reinforcing structure integral within and in lamination with another material on at least one surface of the panel.

It is another object to provide such method for making more than one panel at a time.

It is another object of the invention to utilize means for applying a flexible ribbon material to a surface which is substantially wider than the ribbon so that the surface is covered by the ribbon material.

In accordance with the present invention, a form is provided which provides a major surface and the edges of a panel. Onto the surface is laid a ribbon of flexible material coated on one side with soft foam. Course after course of the foam coated ribbon is laid adjacent on the surface with the foam side against the surface so that the foam flows from one course into another and cures forming a solid integral rigid foam panel of predetermined dimensions and shape with the edges of the panel all clearly defined as it is lifted from the form. A specific embodiment of the invention described herein provides for making such a panel which is a section of a spherical surface such that a number of such panels when joined together define a hemispherical enclosure. In this embodiment, panels are formed with a covering of the ribbon material on one side so that the ribbon material is on the outside of the hemispherical enclosure and provides a protective outside covering on the foam panels.

Other features and objects of the invention will be apparent in view of the specific description of an embodiment of the invention taken in conjunction with the figures in which.

The present invention includes method and structure for making large rigid foam panels which are of predetermined dimensions and shape and preferably include a reinforcing structure within the foam. A single embodiment of the apparatus shown in the figures herein is particularly intended for making the panels with frothing, urethane foam. However, this is not intended to exclude use of other kinds of foam even though many presently known in the art are not as suitable as frothing urethane foam. There are at present marketed a number of urethane foam mix formulas. Most include at least two compounds which are kept in separate containers and when used are fed under pressure through pipes to a mixer and nozzle. The principal components contained in separate tanks are generally designated the A and B components. The A component is a polyisocyanate which may be, for example, toluene diisocyanate. This material is relatively nontoxic and is liquid at room temperature. The B component is a polyhydroxyl compound such as a polyester or polyether. It is preferably liquid at room temperature and usually contains a catalyst such as an organic amine, a cell control agent and a blowing agent which may be water, $CCl_2F_2$ or $CCl_3F$ or a combination of these. Frothing foam is produced by feeding these components to a commercially available frothing foam mixer, expander and nozzle. The mixer is usually a mechanically driven agitator. The components are fed into the mixing chamber and an auxiliary blowing agent is usually added to the chamber. A venturi at the end of the chamber feeds the mix into an expansion chamber which leads to a discharge nozzle.

The urethane frothing foam is discharged at a relatively low pressure and can be free blown to a density of between two and ten pounds per cubic foot. The frothing foam is mixed and dispensed partially expanded and so it expands relatively little after issuing from the nozzle (two or three times). This is to be compared with conventional foam mix which expands as much as thirty times after issuing from the mixing nozzle. The density of the cured foam is determined principally by the amount and quality of the blowing agent that is used. The more blowing agent that is used, the lower will be the density. Also the greater the concentration of fluorocarbon in the water blowing agent, the lower will be the density of the cured foam. Urethane foams of eight pounds density have a tensil strength of over 200 psi and a compressive strength of over 250 psi at standard temperature.

Frothing urethane foam hardens more quickly than conventional poured urethane foam. Froth foam of density between 6 and 8 pounds per cubic foot (pcf) is sufficiently soft for a number of seconds after issuing from the nozzle to be scraped or worked easily. The density of the foam as it issues from the nozzle and the length of time it remains soft to the touch can be controlled by varying the blowing agent and by varying the pressure of preexpansion in the mixing and expanding nozzle.

In the present invention, the frothing urethane foam is deposited on a moving ribbon of flexible material which is directly laid down, while the foam is soft, on a form with the foam side against the form. Course after course of the foam coated ribbon is laid across the form with the foam in a soft pliable state. The foam mix is preferably urethane froth foam such as described above and is applied to the ribbon with one or more commercially available urethane froth foam mixer, expander and nozzle units. The froth foam mix formula is selected to provide a cured foam of desired density and strength and which will remain soft after issuing from the nozzle onto the ribbon a sufficient interval for the mechanism, shown in FIG. 1, to apply the foam coated ribbon to the form with reinforcing structure on the form embedded in the soft foam.

Figure 1:
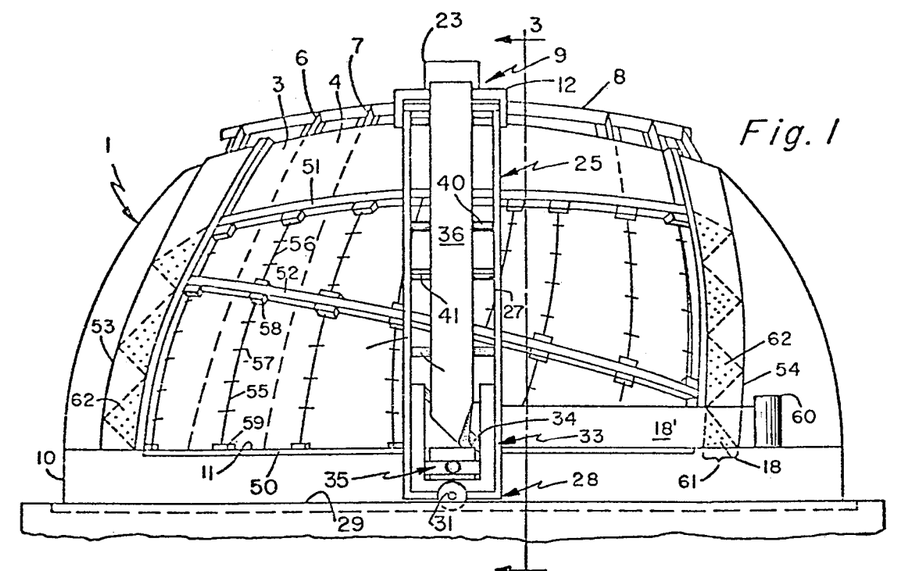
FIG. 1 is a front elevation view of apparatus for making relatively large rigid plastic foam panels of predetermined dimension and shape.
Figure 2:
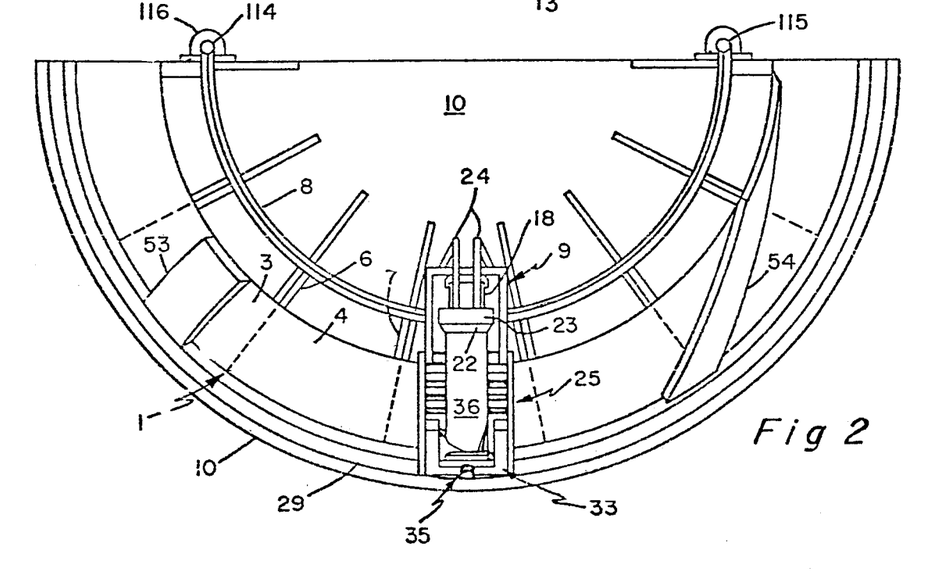
FIG. 2 is a top view of the apparatus.
Figure 12:
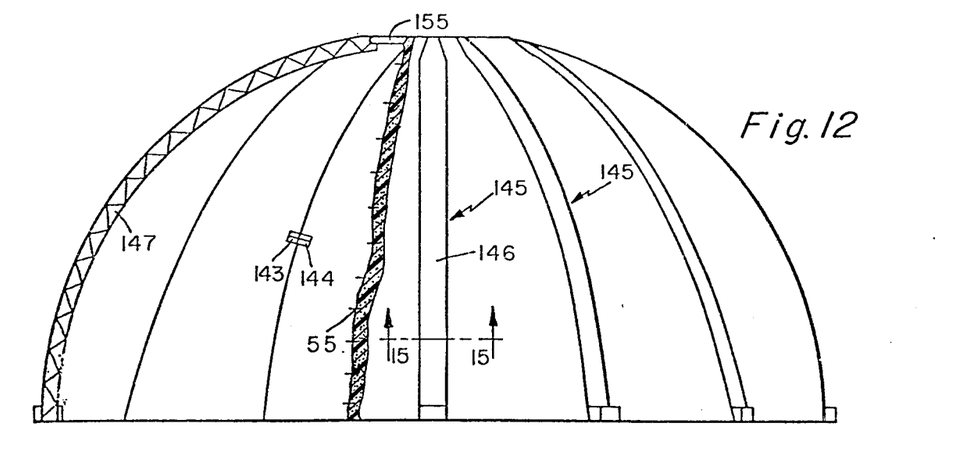
FIG. 12 illustrates a hemispherical enclosure formed by arcuate panels joined side by side.

FIGS. 1 and 2 are front and top views of the apparatus for applying the soft foam to a form. The form 1 is a large arcuate surface with, for example, equal curvature in all directions and so the surface is a portion of a sphere. The form may be disposed in a generally horizontal or vertical position or at some position inbetween depending upon the part gravity may play in causing the soft foam which is laid on the form to cure into panels of uniform density and dimension. In FIGS. 1 and 2, the form 1 is shown in an orientation which is substantially vertical and the portion of the form which is used defines two panels of identical shape and size and such that when twelve such panels are erected as shown in FIG. 12 with support members joining the panels, a hemispherical enclosure is formed. The form 1 shown as a rigid structure in these Figures may also be a balloon inflated to provide the curved surface on which the foam is laid. The rigid form 1 may also be a section of an in situs enclosure in which case the foam is applied in situs.

Figure 3:
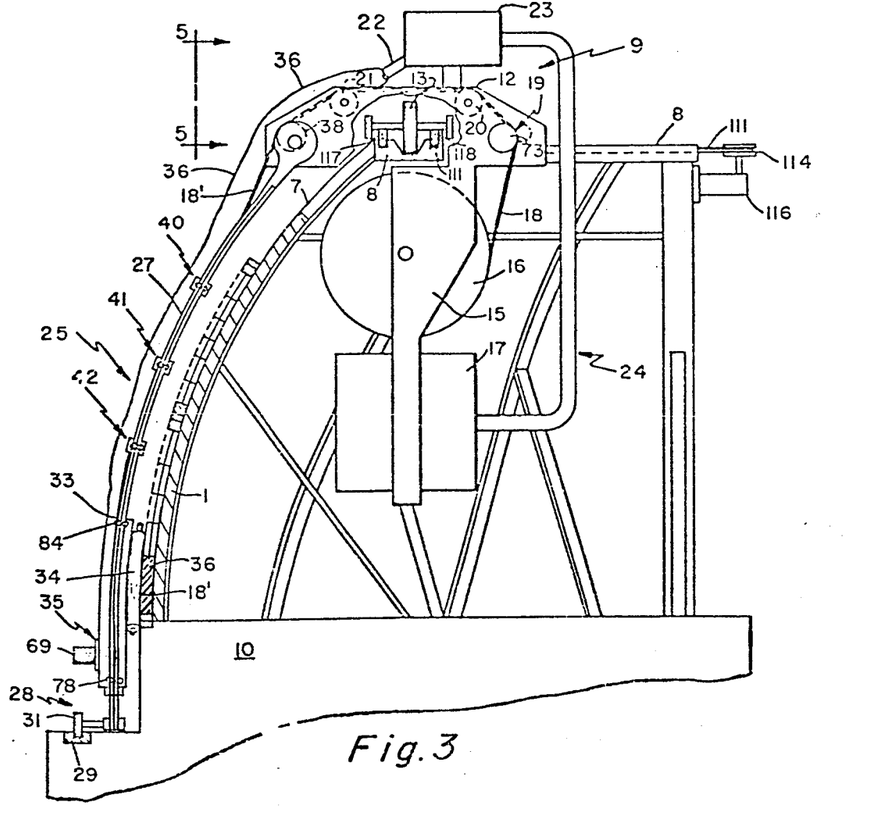
FIG. 3 is a side sectional view of the apparatus taken as shown in FIG. 1.

The form shown also in cross section in FIG. 3 may be formed in sections such as 3 and 4 mounted on the vertical form and track support members such as 6 and 7 which are arcuate and have the same curvature of the form surface. The support members 6 and 7 are mounted to a platform 10 and provide support for the form panels and also support the rear parallel track 8 on which the trolley 9 rides. This track is horizontal and substantially parallel to the top edge of the portion of the form on which the foam is laid down to make the panels. For this reason, the track is curved and so as the trolley 9 rides along the track, the spacing between the trolley and the surface of the form remains constant.

The form 1 is so erected that the bottom edge 11 of the form defines a horizontal equatorial line of a hemisphere. In this case, the center of curvature of the trolley track 8 is on the vertical axis of the hemisphere defined by the form.

Figure 4:
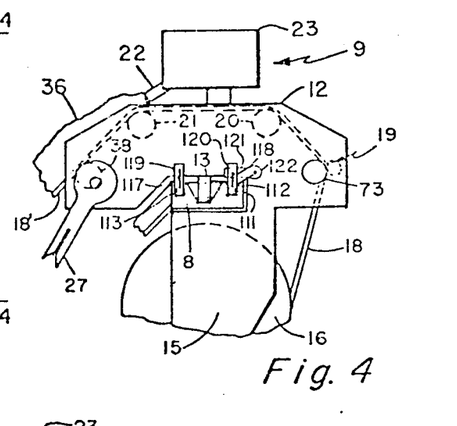
FIGS. 4 and 5 are side and front views of the moving trolley and transverse track assemblies which carry the flexible ribbon, the foam mixer, foam nozzle and tanks of mix materials.
Figure 5:
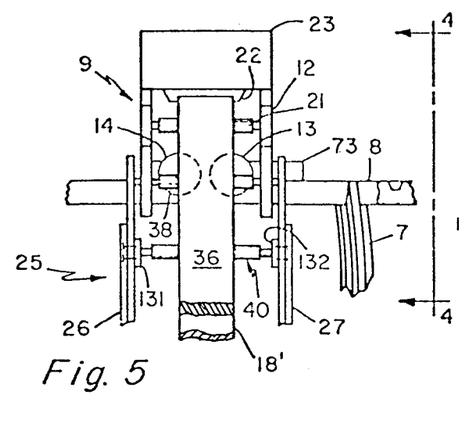

The trolley assembly 9 is shown in detail in FIGS. 3 to 5. It includes a frame 12, trolley wheels 13 and 14 supported by the frame, and underslung support rack 15 which supports the roll 16 of flexible ribbon and the tanks 17 of foam mix ingredients. The roll of ribbon and tanks are preferably located directly under the wheels 13 and 14 and since these constitute the greatest weight in the trolley assembly, they place the center of gravity of the assembly along a vertical line which passes directly through the trolley wheels.

The ribbon 18 paying off the roll 16 is fed through a pair of drive rollers 19 and over the idler rollers 20 and 21 at the top of the trolley frame and just beneath the nozzles 22 of one or more froth foam mixer and expander devices 23. All the ingredients for producing the urethane frothing foam by the mixer devices are carried from the tanks 17 supported beneath the trolley via pipes 24 to the mixers. The mixer rotors are driven by electric motors electrically energized by power lines and controls which are not shown. All the necessary valves, pressure controls and pumps necessary for storing the urethane froth foam compounds and feeding them to the mixer and controlling the expansion pressure and rate of flow of froth foam from the mixer nozzles onto the strip of ribbon moving beneath the mixers are provided. These various controls valves, etc. are not shown as they are commercial items, often provided by suppliers of the foam mix. For example, the ingredients of the urethane froth foam mix and the tanks, valves, and pressure controls for feeding the mix components to the mixers 23 may be obtained from CTR Division of the Upjohn Company, Torrence, California or Isocyanate Products, Inc., Wilmington, Delaware. The froth foam mixer, expander and nozzle may be obtained from any of a number of vendors.

The transverse track assembly 25 consists of two rails 26 and 27 which attach to the front end of the trolley carriage 12 and extend over the surface of the form 1 to a rolling support structure 28 at the front end of the transverse track. This support structure may consist of front track 29 curved to follow the bottom edge 11 of the form and having a center of curvature through which passes the axis of the hemisphere defined by the form. A wheel 31 carried by the support 28 rides in track 29 and so the trolley assembly which carries the roll of ribbon, the tanks of foam froth mix, the mixer and ribbon drive connects to the transverse track and this assembly of structures is supported by the two trolley wheels 13 and 14 riding along the rear track 9 and a front wheel 31 riding along the front track 29. As this assembly moves along the tracks 8 and 29, the transverse track 25 is moved from one end of the form 1 to the other and the spacing between the track 25 and the surface of the form 1 remains constant.

The transverse track carriage 33 rides up and down the transverse track and so the carriage is moveable over the surface of the form in two dimensions. It is moved in one dimension when the trolley moves along the track 8 and in a transverse dimension when the carriage rides up and down track 25. The ribbon lay down roller 34 and the ribbon stamp device 35 are carried by the carriage. The functions of these are described below.

The ribbon 18 from the roll 16 passes through the drive rollers 19 over the idler rollers 20 and 21 below the mixer nozzle 22, over the roller 38 at the front end of the trolley carriage, over the sliding rollers 40 to 42 which are moveable along the track 25, and on to the lay down roller 34. The lay down roller 34 is inclined at an angle 45° to the direction of flow of the foam carrying ribbon 18′ down the track 25 and so the foam carrying ribbon pays off the roller 34 in a direction transverse to the direction of the track 25 and therefore in a horizontal direction as shown in FIG. 1. By this action, the foam 36 on the ribbon 18′ begins at the top surface of the ribbon at top of the trolley and along the track 25. Then, when the ribbon is payed off the lay down roller 34 in the horizontal direction, this is reversed and the foam 36 on one side of the ribbon is laid down on the form. The lay down roller 34 is spaced from the surface of the form by substantially the thickness of the curved panel. The edges of the panel to be formed are defined by the longitudinal panel dividers 50, 51 and 52. Divider 51 defines the longitudinal edge of the upper panel formed, and divider 52 defines the other longitudinal edge of that panel and the edge of the second panel formed and 50 defines the other edge of the second panel. The ends of the two panels made on the form are defined by the end plates 53 and 54. The height of the end plates and the height of the dividers from the surface of the form are all constant and at least as great as the thickness of the foam laid on the ribbon. This height is substantially equal to the finished panels.

Transverse reinforcing bars such as 55 and 56 extend between the longitudinal dividers 50, 51 and 52. These may consist of rods having a matching curvature to the curvature of the form with spacers such as 57 along each rod which embed in the soft foam when it is laid onto the form. The spacers determine the minimum thickness of the finished foam and act as anchoring devices for the reinforcing rods. Each rod such as rod 55 is supported and held in place by blocks such as blocks 58 and 59 at each end of the rod. The blocks are attached to the longitudinal edge dividers or to the form and serve to support the transverse rod and also form cavities along the edges of the panels so that later when the foam laid on the form is cured and the panels removed from the forms, these blocks may be removed from the ends of the reinforcing rods leaving access cavities along the edge of the panel by which to gain access to the reinforcing rod for attachment in an assembly of panels, as described hereinbelow with reference to FIGS. 12 to 16.

Figure 13:
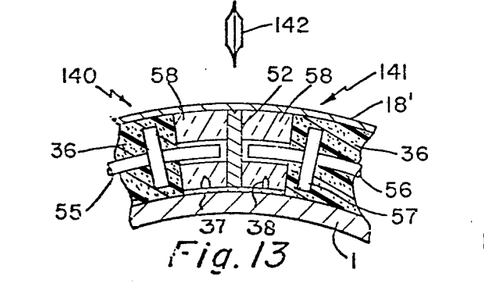
FIG. 13 is a cross section view taken through panels on the form showing the separation between panels, reinforcing within the foam and the removable end blocks at the edge of each panel.
Figure 14:
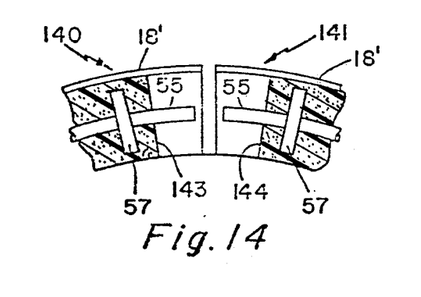
FIG. 14 is a cross section view similar to FIG. 13, but with the panels removed from the form and the end blocks removed providing access cavities to the reinforcing rods in the panels.

In operation, the edge defining parts 50 to 54 are mounted on the form 1 and the reinforcing rods such as 55 and 56 with end blocks such as 58 and 59 are mounted to these by block positioning plates such as 37 shown in FIG. 13. These plates attach to the dividers such as 51 and 52 and contain pins such as 38 which engage the end blocks. Then the trolley 9 and transverse track 25 assembly is moved along the tracks 8 and 29 so that the transverse track 25 lies over the end plate 54. The carriage is then positioned over the lower end of the end plate 54. The ribbon 18 is pulled off reel 16 over rollers 20 and 21 beneath the foam nozzle 22, down over rollers 40 to 42 and lay down roller 34 and across the bottom of end plate 54 to the take up reel 60. The take up reel 60 pulls the free end of the uncoated ribbon 18 while frothing foam 36 is dispensed from the nozzle onto the ribbon and the take up reel continues to pull the ribbon until the foam coating 36 reaches the inside edge of the end plate 54. At this point, the short length 61 of the ribbon extends across the end plate 54 is not coated with foam and is fixed to the plate 54 by manually stamping with a rubber mallet which impales the ribbon on spikes 62 that project from the plate and puncture the ribbon to hold it. The form coated ribbon is laid down as the combined assembly of the trolley and transverse track move along the front and rear rails 29 and 8, respectively, and as the foam coated ribbon is fed down the transverse track and over the lay down roller 34. The rate of feed of the foam coated ribbon down the transverse track and over the lay down roller is synchronized with the speed of the combined assembly along the tracks 29 and 8. The carriage 33 remains at a fixed position on transverse track 25 as shown in FIG. 1 while the first course or length of the foam coated ribbon is laid on the form. The lay down roller 34 presses the foam coated ribbon down over the reinforcing rods 55 and the panel dividers 50 to 52. Since the foam is soft, it is easily pressed over the reinforcing bars, spacers and dividers and flows around these so that they are embedded in the foam. Residual expansion of the foam causes the laid down ribbon to smooth out.

Figure 9:
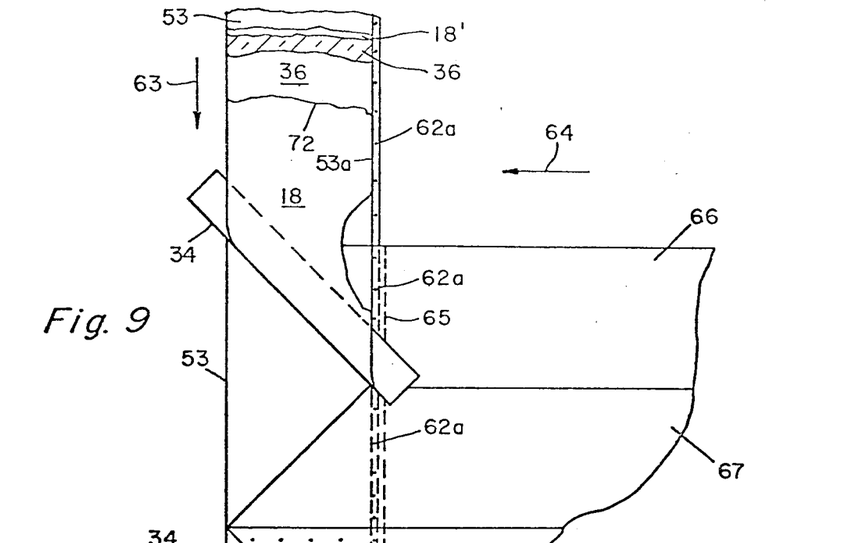
FIGS. 9 to 11 reveal the action of the lay down roller at the end of each course of foam coated ribbon laid on the form, whereby the ribbon is secured to the end plate.
Figure 10:
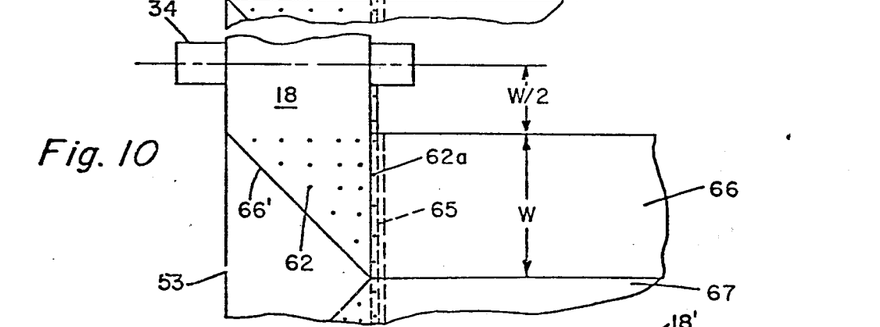
Figure 11:
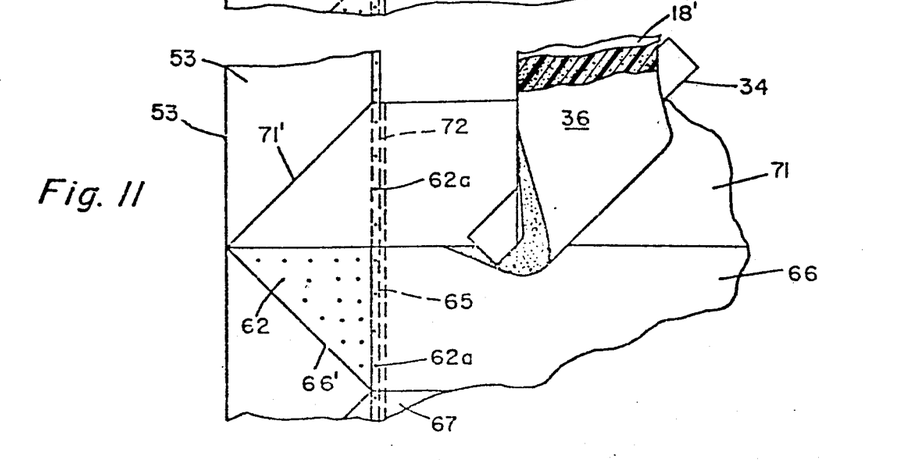

When the combined structure including the trolley and transverse track reach the other end of the form, at the end plate 53, an operation is performed as illustrated pictorially in FIGS. 9 to 11. FIG. 9 shows the position of the lay down roller 34 relative to the direction 63 of ribbon feed and the end plate 53. The rest of the form, the transverse track and the carriage are not shown in these figures. The direction of motion of the lay down roller 34 as it approaches the end plate 53 is indicated by the arrow 64 in FIG. 9. As soon as the lay down roller reaches the position on the end plate 53 as illustrated in FIG. 9, the roller will have come to the end of foam coating 36 on the ribbon 18' as represented on the broken line 65 and so a short stretch of the ribbon beginning at this point is not coated with foam and so no foam is laid down on the end plate 53. Roller 34 rolls the ribbon onto the short spikes 62a along the raised edge 53a of end plate 53. These spikes pierce the ribbon and hold it.

Immediately upon reaching the position shown in FIG. 9 the combined assembly of trolley and transverse track along the front and rear parallel tracks 29 and 8 comes to a halt and the lay down roller 34 is moved to a position on the carriage 33 so that it is oriented relative to the end plate 53 and the last course 66 which is adjacent the previous course 67, etc., as illustrated in FIG. 10. The mechanism on the carriage for moving the lay down roller 34 to this position and other positions is described hereinbelow with reference to FIGS. 6 to 8.

When the lay down roller 34 is positioned from the position shown in FIG. 9 to the position shown in FIG. 10, simultaneously, the carriage 33 rides up the track 25 a distance equal to the width (W) of the ribbon and then the ribbon stamp plate 68 carried on the carriage 33 (shown in FIG. 7), is driven against the folded ribbon 66' at the end of course 66 on the end plate 53 causing the ribbon 66' to be impaled on the spikes 62 projecting from the plate. The ribbon stamp plate is actuated by a pneumatic hydraulic or electric actuator 69 mounted on the carriage. The actuation of the ribbon stamp plate is very rapid and occurs only when the roller 34 is drawn up on the carriage to the horizontal position and the carriage is moved up the track placing the roller as shown in FIG. 10. In this position, the roller 34 is out of the way of the stamp plate. Next, the lay down roller 34 is positioned at an angle of 45° to the right of the direction of feed 63 of the ribbon in preparation for laying down course 71 as shown in FIG. 11. The foam coating on course 71 begins at the broken line 72 which is at the edge of the end plate 53. The roller 34 rolls ribbon 18 over the short spikes 62a along raised edge 53a of the end plate and so begins course 71 with the ribbon fixed on spikes 62 (at the end of course 66) and spikes 62a at the beginning of the course 71.

The movements of the carriage and roller at the ends of each course illustrated in FIGS. 9 to 11 and the action of the stamping device 35 in impaling the ends of the ribbon on the spikes 62 which protrude from the end plate, occur very rapidly and so the flow of foam coated ribbon down the transverse track and over the lay down roller is interrupted only momentarily, no more than a few seconds. The drive rollers 19 which feed the ribbon past the foam nozzles 22 and down the transverse track 25 are driven by motor 73 which is energized in synchronism with the actions of the carriage 33 and lay down roller 34.

The foam coated ribbon pays off the lay down roller 34 and is laid down evenly on the form provided the ribbon is fed to the roller 34 at the proper rate synchronized with the position and motion of the roller. The ribbon should be of sufficient strength so that when gripped and held firmly by the spikes 62 at the end plates 53 and 54, the ribbon will remain sufficiently taut over the lay down roller 34 to maintain alignment of the course being laid down adjacent to the previous course. The proper amount of tension between the lay down roller 36 and the end plate is obtained by controlling the rate of feed of the ribbon to the lay down roller in conjunction with the rate of motion of the combined assembly of trolley 9 and transverse track 25 along the form. In applications where the ribbon is relatively wide, the foam is thick and/or the length of each course of ribbon laid down is long, it may be necessary to drive the lay down roller in rotation at a rate synchronized with the rate of feed of the ribbon to the roller and synchronized with the rate of motion along the form. When the lay down roller 34 is so driven, the tension in the ribbon between the roller and the end plate is most positively maintained. The embodiment of the invention described herein does not include any such drive for the lay down roller.

Figure 6:
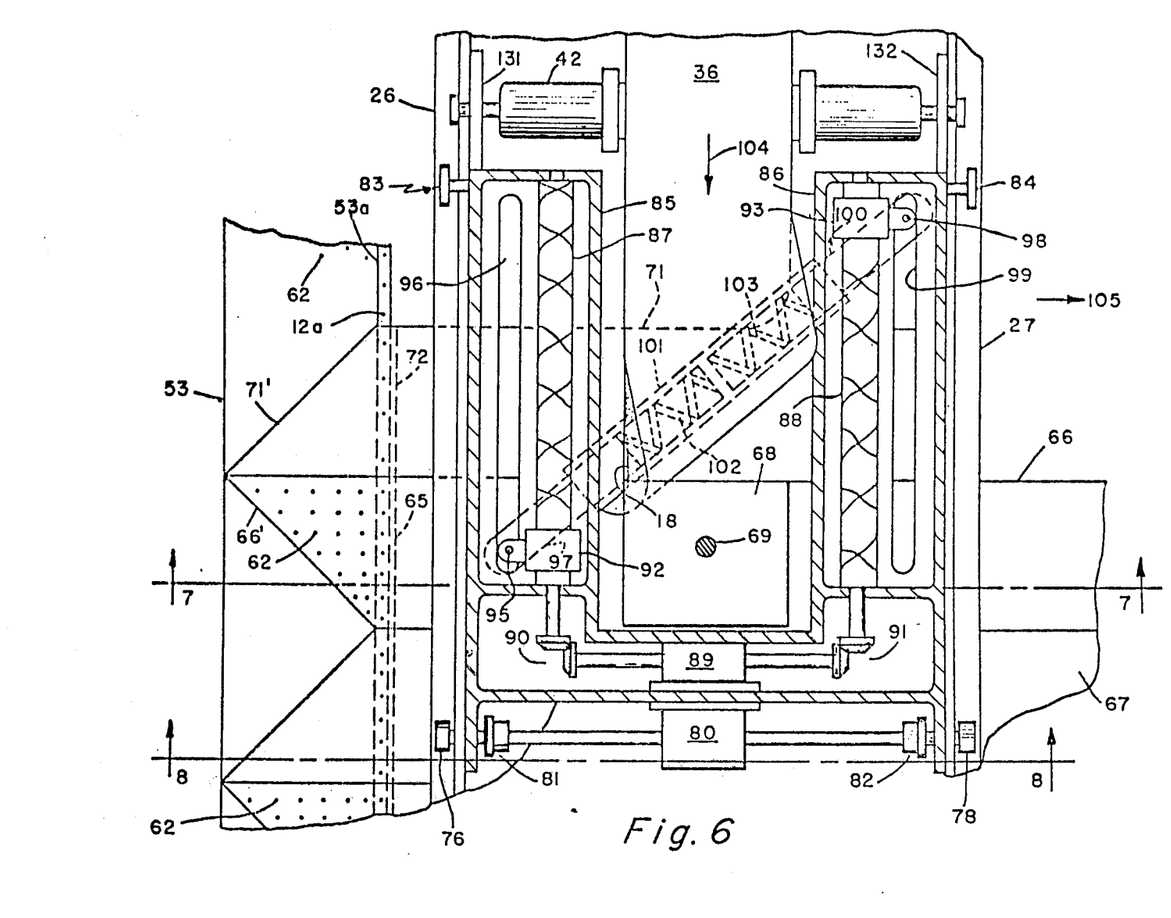
FIG. 6 is an enlarged front view revealing details of the carriage which rides on the transverse track and the lay down roller carried by the carriage.
Figure 7:
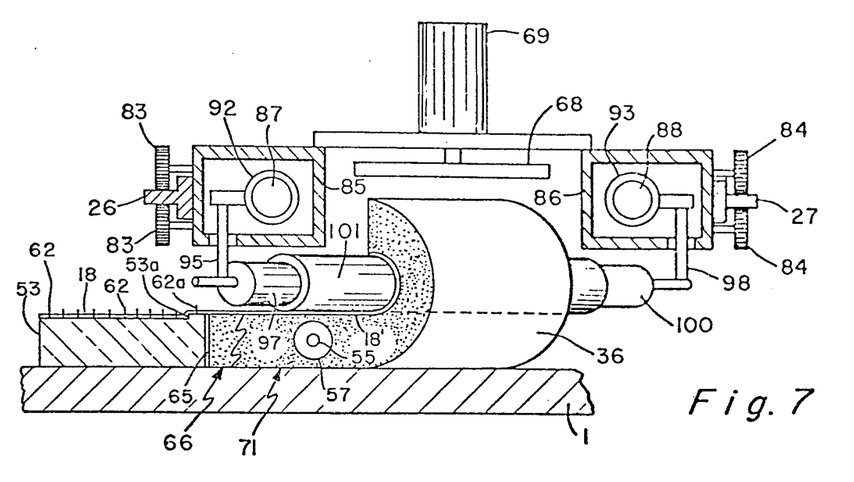
FIGS. 7 and 8 are end views of the carriage and transverse track showing how the foam coated ribbon is payed off the lay down roller and onto the form and the ribbon is secured to a plate at the end of the form which holds the ribbon securely at the ends of each course applied to the form.
Figure 8:
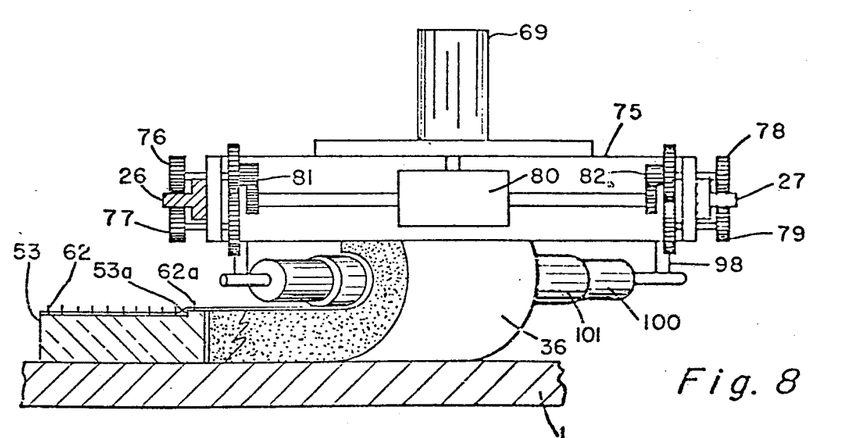

The construction and operation of the carriage and lay down roller is shown in detail in FIGS. 6 to 8. FIG. 6 is a front view of the carriage with the top surface of the carriage housing broken away to reveal parts therein. FIG. 8 is an end view of the carriage and FIG. 7 is an end sectional view to reveal further details of the operating parts in the carriage. The carriage 33 as shown in FIGS. 6 to 8, is generally a U shaped structure which rolls on the left and right rails 26 and 27 of the transverse track 25. The carriage includes a U shaped housing 75 located between the rails 26 and 27 with drive wheels 76 and 77 engaging rail 26 on opposite sides of the rail and drive wheels 78 and 79 engaging rail 27 on opposite sides of that rail. The carriage drive motor 80 drives the wheels 76 and 79 via gear mechanisms 81 and 82. Pairs of idler wheels 83 and 84 at the other end of the housing make positive engagement with the rails 26 and 27, respectively, and so the carriage is in positive contact with the rails and the distance between the carriage and the form is maintained constant at all positions of the carriage along the track. Within each of the upright arms 85 and 86 of the housing is mounted a double helical screw. The double helical screw 87 in arm 85 and the screw 88 in arm 86 are located on parallel axes which are also parallel to the transverse track. These screws are driven in rotation on their axes by the screw drive motor 89 which couples by bevel gears 90 to the screw 87 and gears 91 to the screw 88. Riding on each of these screws is a screw follower which rides from one end of the screw to the other as the screw turns and upon reaching an end of the screw reverses its direction and comes back the other way even though the screw continues turning in the same direction similar to the way the eye is moved on a fishing reel. The screw followers 92 on screw 87 and 93 on screw 88 commence at positions at opposite ends of their respective screws as shown in FIG. 6 and so regardless of the direction of rotation of the screws (provided the screws are driven together at the same rate), the followers 92 and 93 will always be moving in opposite directions along their respective screws and simultaneously reach opposite ends of their respective screws. When, for example, the follower 92 is midway between the ends of the screw 87 on its way up, the follower 93 will be midway between the ends of screw 88 on its way down.

An arm 95 extends from follower 92 through clearance slot 96 in the housing to one axle 97 of the lay down roller 34. Arm 98 extends from follower 93 through clearance slot 99 to the other axle 100 of the lay down roller. The axles 97 and 100 of the lay down roller are slideable within the body 101 of the roller and the position of the roller body along the axles 97 and 100 is maintained by springs 102 and 103 which act between the axels 97 and 100 and the middle of the roller body, respectively. Thus, the body 101 of the roller is maintained centered between the arms 95 and 98 regardless of the separation between these arms as the followers 92 and 93 ride up and down their respective helical screws.

In FIG. 6, the position of the lay down roller 34 relative to the direction of flow of the foam coated ribbon 18′, as indicated by arrow 104, is proper for laying down the course 71 of foam coated ribbon on the form as the carriage moves in the direction of arrow 105 relative to the end plate 53. This corresponds to the action of the roller illustrated in FIG. 11. Just before this action at the end of course 66, the roller 34 is positioned relative to the carriage 33 and the carriage is moved relative to the end plate 53 as already described above with reference to FIGS. 9 to 11. The carriage is driven from one position to another by energizing carriage drive motor 80 and the roller 34 is driven from one position to another as illustrated in FIGS. 9 to 11 by energizing the screw drive motor 89. Each time motor 89 is energized, the followers 92 and 93 move in opposite directions along their screws to position the roller relative to the carriage.

When the roller 34 moves to the position illustrated in FIG. 10 upon completing course 66, the followers 92 and 93 are driven to the middle of their respective screws while at the same time the carriage is driven up the track 25, as already described by energizing carriage drive motor 80 and so there is clearance between roller 34 (in the position shown in FIG. 10) and the bottom of the U shaped carriage housing 75, through which the ribbon stamping plate 68 moves down to the end plate impaling the ribbon fold 66′ on the spikes 62 which project from the end plate. Then, the roller 34 is positioned 45° to the right making the fold 71′ and course 71 begins with the roller impaling the ribbon on spikes 62a along the raised edge 53a of the end plate. With the roller 34 positioned on the carriage as shown in FIG. 6, laying down course 71, the combined assembly of trolley 9 and transverse track 25 moves in the direction of the arrow 105 across the form to lay down the course 71.

The mechanism for driving the combined assembly of trolley and transverse track along the front and rear tracks 29 and 8 includes, for example, a continuous cable 111 which slides within fore and aft channels 112 and 113 in the main track 8. The cable is captured, but slides easily within these channels and over pulleys 114 and 115 at the ends of the track 8. One or both of these pulleys may be driven by a motor such as motor 116 and so the continuous cable moves in one direction along the channel 113 and in the opposite direction along the channel 112 in the track 8. One or more arms such as 117 and 118 attached to the cable extends from the cable and out of the channel and so as the cable is driven by the motor 116, the projecting arms 117 and 118 move along the track 8. Clearance slots 119 and 120 are provided through the trolley housing 12 so that the cable arms 117 and 118 will pass through these clearance slots and not engage the trolley unless engaging arm such as 121 on the side of the housing is disposed across the slot. When the engaging arm 121 is positioned across the slot 120 as shown in FIG. 4, the cable arm 118 will engage arm 121 and move the trolley along the track 8. A similar arm such as 121 is located on the other side of the trolley and when positioned across the slot 119 is engaged by the cable arm 117 to move the trolley along the track 8 in the opposite direction. These engaging arms located on the trolley are actuated by solenoids such as 122 which positions the arm 121 and so actuation of one of the solenoids engages the trolley with the cable drive. This mechanism for driving the trolley along the horizontal track 8 is shown for purposes of illustration and is a relatively simple structure. Other structures for doing the same thing could be substituted for this and provide satisfactory operation. The sliding rollers 40 to 42 are held in position along the track 25 by friction. Each of these engages the track as illustrated in FIG. 6 which shows the sliding roller 42 mounted between plates 131 and 132 which engage the rails 26 and 27 by pairs of rollers 133 and 134, respectively, in such a manner that the roller 42 can be set at any position along the track and will remain in the position set until the carriage housing 75 abuts the plates 131 and 132. Thereafter, as the housing moves up the track, the sliding roller 42 will move with it and eventually pick up the sliding rollers 41 and 40 moving them ahead of the carriage. The rollers 40 and 42 are set in position at the beginning of operation or after all of a set of courses of the foam coated ribbon are laid on the form and the carriage is moved to the bottom of the transverse track in preparation for the next operation.

More than one layer of foam coated ribbon may be laid on the form to build up the panel. It is preferred that first the adjacent courses such as 67, 66 and 71 be laid on the form from the bottom to the top thereof. Then, before the next set of courses is laid on this to build up the thickness of the panels, the transverse track is connected to the trolley housing at a different position and the wheel 31 at the front end of this track is set at a new position so that the track is moved out from the form 1 by a distance equal to the thickness of the first set of courses of foam laid on the form. Then, the process is repeated to lay a second set of courses of foam coated ribbon on the first set. Quite clearly, this process can be repeated many times to build up the thickness of the panel with many layers of ribbon sandwiched between layers of foam.

When the foam has cured on the form, the ribbon is cut along the divider bars 50 to 52 and along the edge of the end plates 53 and 54. Then the two separate panels are lifted from the form. In order to insure that the foam does not stick to the form and does not stick to the edges of the end plates and to the dividers, these parts may all be suitably coated. Urethane foam will not stick to polyethylene film, teflon or wax and so the parts may be coated with any of these.

Figure 15:
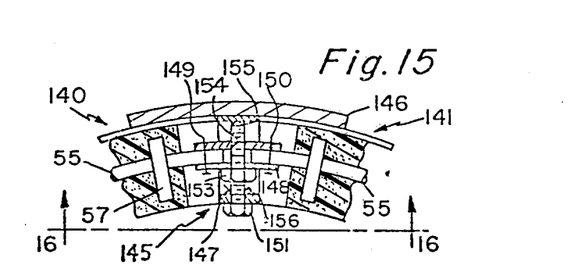
FIG. 15 is a similar cross section view taken as shown in FIG. 12 revealing the two panels joined in the hemispherical enclosure with a T shaped support member inbetween.
Figure 16:
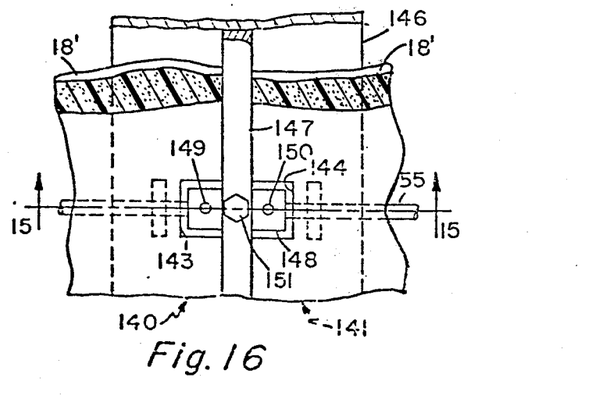
FIG. 16 is a view from inside the enclosure of the same two joined panels revealing the structure for joining the panels to the T shaped support member and the access cavities formed by the removed end blocks.

FIG. 13 illustrates in sectional view, the two panels on the form at the location of the divider 52. The one panel 140 and the other panel 141 share the same courses of ribbon along the divider and so it is necessary to cut through the ribbon along the divider employing a cutter such as 142. When the ribbon is cut on all edges of the panels, the panels are lifted from the form and the end blocks such as 58 in panel 140 and 58' in panel 141 are removed leaving cavities 143 and 144 in the foam along the edges of the panels at the locations of the reinforcing rods 55. The panels are then erected with T shaped ribs inbetween. The ribs such as 145 shown in FIG. 12 provide some support for the resulting hemispherical enclosure and also provide means for joining the abutting panels. This is shown in detail in FIGS. 15 and 16. FIG. 15 is a sectional view taken as shown in FIG. 12 showing how the abutting edges of two panels 140 and 141 are joined to the T shaped rib 145. The rib consists of a relatively broad plate 146 which may be of little strength and an arched structural member 147. The plate 140 is preferably broad so that it overlaps substantially both of the joined panels and can be effectively sealed to the ribbon covering these panels. The arched structural member 147 is abutted by both the panels and has clearance through it for a sleeve 148 which engages the ends of rods 55 in adjacent panels 140 and 141. Rod anchor pins 149 and 150 impale these rods to the sleeve. A sleeve anchor bolt 151 fastens the sleeve to the structural support member 147 and provides for positioning the panels tight against the plate 146. Thus, the rods in abutting panels 140 and 141 are fixedly attached together and then attached to the structural member 147. The bolt 151 is inserted into a hole 152 on member 147 and screws into nut 153 attached to the sleeve and through transverse clearance hole 154 in the sleeve until the end of the bolt abuts the member 147 at 155. Then a cotter pin 156 is inserted through the bolt so that the bolt is captured in the member 147. Thereafter, when the bolt is turned one way or the other, the sleeve moves toward or away from plate 146 and so the panels 140 and 141 are secured against the plate 146. FIG. 16 is a view taken as shown in FIG. 15 showing the access cavities 143 and 144 to the ends of the reinforcing rods in the panels. After the panels are joined and pinned as shown in FIG. 15, these access cavities may be filled with foam and the seams or spaces between the panels may be caulked with foam.

The opening at the top of the hemispherical enclosure shown in FIG. 12, defined by a lantern ring 155 which engages and joins the ends of the reinforcing T support members may be enclosed by a cap or fitted with a ventilating device of suitable type.

The apparatus described herein for making relatively large panels of rigid foam includes many actuated parts. The synchronism between actuations is clearly described herein. It would clearly be an advantage if the synchronism were automatic so that once that the apparatus was started, it would continue to operate with the trolley and transverse track moving back and forth across the form, the carriage moving up and down the transverse track and other drives operating as described herein to lay down course after course of foam coated ribbon on the form to complete one or more panels. Such an automatic control could be provided within the scope of the present invention or the apparatus could be operated by a human operator energizing the various motors and actuators as described to make the panels.

The apparatus described herein produces one or more panels at the time which are removed from the form and erected at a site as described. The technique employed could also be used for situs construction of walls, floors, ceilings, etc. The form and apparatus for laying the foam coated ribbon could be moved from position to position along the walls of part of the in situ structure forming an enclosure and at each position, the foam coated ribbon laid down as described herein to complete the wall section by section. In such application of the invention, the form could be part of the wall structure or it could be moved from position to position along with the apparatus.

The specific embodiment described herein employs a form which is essentially an open form disposed substantially vertical. This orientation of the form permits erection and operation of the apparatus on a minimum of floor space and enlists gravity to insure that adjacent courses of foam laid down on the form flow together at their edges to insure an integral mass of foam throughout the whole panel. It is to be clearly understood however that the open form may be disposed substantially horizontal which would require some slight modification of the rest of the apparatus. With the horizontal orientation construction and operation would be substantially as described herein. These and other modifications of the apparatus apparent to those skilled in the art are within the spirit and scope of the invention as set forth in the appended claims.

What is claimed is:

1. A method for making relatively large rigid foam panels comprising, the steps of:
   providing a form surface which defines the shape of the panel,
   feeding frothing urethane foam onto a ribbon,
   laying down a first length of the ribbon on the form surface with the foam coated side of the ribbon against the form surface,
   laying additional lengths of the ribbon on the form surface in the same manner alongside the first length and side by side in courses sufficiently close in order that the foam coatings flow between the courses and cohere together while still tacky,
   causing the foam to cure so that the courses of foam form an integral layer of rigid material and
   removing the cured foam panel from the form surface.

2. A method as in claim 1 and in which,
   the courses of foam coated ribbon are laid on the form by a lay down roller over which the ribbon rolls in the following steps,
   feeding foam coated ribbon over the roller while the roller is oriented at 45° to the direction of feed of the ribbon and the ribbon is laid down in a direction 90° to the direction of feed,
   moving the roller across the surface opposite the direction of lay down on the surface from one edge of the surface to the opposite edge to lay down said first course,
   moving the roller in a direction opposite the direction of ribbon feed,
   fixing the ribbon at the end of the first course to the edge of the form, fixing the ribbon beginning the next course to the end of the form,
turning the roller to a position at 90° to the 45° orientation,
moving the roller in the direction of the ribbon feed, and moving the roller across the surface of the form in a direction transverse to the direction of ribbon feed to lay down the next course of foam coated ribbon on the form.

* * * * *